United States Patent
Novotny

(10) Patent No.: US 7,453,621 B2
(45) Date of Patent: Nov. 18, 2008

(54) MICRO MIRRORS WITH PIEZOELECTRIC RELEASE MECHANISM

(75) Inventor: Vlad Novotny, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 335 days.

(21) Appl. No.: 11/366,943

(22) Filed: Mar. 1, 2006

(65) Prior Publication Data

US 2007/0206266 A1 Sep. 6, 2007

(51) Int. Cl.
G02B 26/00 (2006.01)

(52) U.S. Cl. .................. 359/290; 359/295; 359/298; 359/323; 345/85; 345/108; 348/770; 348/771

(58) Field of Classification Search .......... 359/223, 359/224, 290–295, 298, 323; 345/85, 108; 348/770, 771
See application file for complete search history.

(56) References Cited

U.S. PATENT DOCUMENTS

| | | | | |
|---|---|---|---|---|
| 5,867,202 A | * | 2/1999 | Knipe et al. | 359/295 |
| 6,533,947 B2 | * | 3/2003 | Nasiri et al. | 216/2 |
| 6,674,562 B1 | * | 1/2004 | Miles | 359/291 |
| 6,867,896 B2 | * | 3/2005 | Miles | 359/290 |
| 6,992,810 B2 | | 1/2006 | Pan et al. | |
| 2002/0149834 A1 | * | 10/2002 | Mei et al. | 359/295 |
| 2004/0240033 A1 | * | 12/2004 | Pan et al. | 359/291 |
| 2005/0030840 A1 | * | 2/2005 | Hagood et al. | 369/44.14 |
| 2005/0128564 A1 | | 6/2005 | Pan | |
| 2006/0049826 A1 | * | 3/2006 | Daneman et al. | 324/207.13 |
| 2008/0062503 A1 | * | 3/2008 | Pan et al. | 359/291 |

* cited by examiner

Primary Examiner—Evelyn A. Lester
(74) Attorney, Agent, or Firm—Fish & Richardson P.C.

(57) ABSTRACT

A spatial light modulator includes a substrate; a hinge in connection with the substrate; a mirror plate that is connected with the hinge and is configured to tilt about the hinge; and a piezoelectric device coupled with the substrate. The piezoelectric device is configured to produce an acoustic wave to assist the separation between the mirror plate and the object.

38 Claims, 9 Drawing Sheets

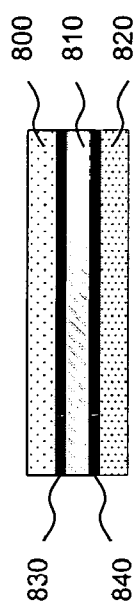
Fig. 8a
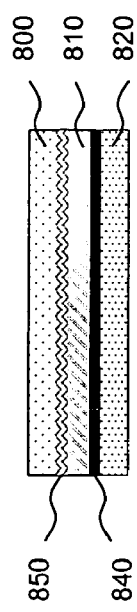
Fig. 8b
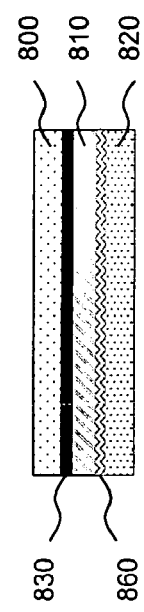
Fig. 8c
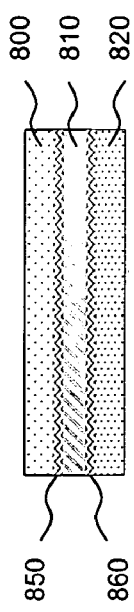
Fig. 8d
Figure 8a-8d

Figure 8e-8g

MICRO MIRRORS WITH PIEZOELECTRIC RELEASE MECHANISM

BACKGROUND

The present specification relates to spatial light modulation devices.

Over the past twenty years, micro-mirror based spatial light modulator (SLM) technology has continuously advanced and gained acceptance in the display industry. A micro-mirror based SLM device operates by tilting a mirror plate around a torsion hinge by an electrostatic torque. The incident light can be deflected to an output direction (i.e., an "on" mirror orientation) or to a light absorber (i.e., an "off" mirror orientation). The tilt movement of the micro mirror can be stopped by a mechanical landing stop, for example, a stationary object that is secured to or is part of a substrate over which the mirror plate is situated, to ensure the output light would be deflected at a precise angle. When the mirror plate comes into contact with a landing stop, adhesive forces at the contact interface can produce stiction between the mirror plate and the landing stop, and it can become difficult to separate the mirror plate from the landing stop when the mirror plate needs to be tilted to a different orientation.

SUMMARY

In one general aspect, the present invention relates to a spatial light modulator that includes a substrate; a hinge in connection with the substrate; a mirror plate that is connected with the hinge and is configured to tilt about the hinge. The spatial light modulator also includes a piezoelectric device coupled with the substrate. The piezoelectric device is configured to produce an acoustic wave to assist the separation between the mirror plate and an object. The object, which acts as a mechanical stop for the mirror plate, can be, for example, a landing tip, which can elastically flex and, hence, act as a spring. The landing tip can be vertically oriented such that its tip is the only part with which the mirror plate can contact.

In another general aspect, the present invention relates to a spatial light modulator that includes a substrate; a hinge in connection with the substrate; a mirror plate that is connected with the hinge and is configured to tilt about the hinge; a landing tip in connection with the substrate, wherein the landing tip is configured to contact the lower surface of the mirror plate to limit the tilt movement of the mirror plate; and a piezoelectric device coupled with the substrate and configured to produce an acoustic wave to assist the separation between the mirror plate and the landing tip.

In another general aspect, the present invention relates to a micro-mechanical device that includes a first mechanical component; a second mechanical component that is configured to limit the movement of the first mechanical component by coming into contact with a portion of the first mechanical component; and a piezoelectric device coupled with at least one of the first mechanical component and the second mechanical component. The piezoelectric device is configured to produce an acoustic wave to assist the separation between the first mechanical component and the second mechanical component.

In another general aspect, the present invention relates to a method for fabricating a spatial light modulator. The method includes fabricating a hinge over a substrate; fabricating a mirror plate in connection with the hinge, wherein the mirror plate can tilt about the hinge and be stopped when the mirror plate comes into contact with an object over the substrate; and coupling a piezoelectric device with the substrate such that piezoelectric devices can produce an acoustic wave to assist the separation between the mirror plate and the object in connection with substrate.

Implementations of the system may include one or more of the following. The object in connection with the substrate can be a landing tip. The mirror plate can include one or more landing tips configured to contact the upper surface of the substrate to limit the tilt movement of the mirror plate in one or more directions. The substrate can include an electrode over the upper surface of the substrate and the mirror plate can include a conductive surface. The mirror plate can tilt when an electric voltage is applied between the electrode over the substrate and the conductive surface of the mirror plate. The mirror plate can include a reflective upper surface, a lower surface having a conductive surface, and a cavity having an opening on the lower surface. The hinge can extend into the cavity. The piezoelectric device can be configured to produce an acoustic wave that vibrates substantially perpendicular or parallel to the surface of the substrate. The piezoelectric device can be configured to produce a first acoustic wave that vibrates substantially parallel to the surface of the substrate and a second acoustic wave that vibrates substantially perpendicular to the surface of the substrate. The piezoelectric device can include a piezoelectric material, a first actuation electrode, and a second actuation electrode. The first and the second actuation electrodes are configured to produce an electric field across the piezoelectric material to produce an acoustic wave to assist the separation between the mirror plate and the substrate. The piezoelectric material can include lead zirconium titanate or zinc oxide. The first actuation electrode and the second actuation electrode can be disposed on a same surface of the piezoelectric material. A plurality of first actuation electrodes and second actuation electrodes can be disposed in an alternating pattern on the same surface of the piezoelectric material. The first actuation electrode and the second actuation electrode can also be disposed on the opposite surfaces of the piezoelectric material. The substrate can include an upper portion that supports the hinge and a lower portion. The piezoelectric device can be sandwiched between the upper portion and the lower portion. The piezoelectric device can be connected to the upper portion or the lower portion of the substrate. The spatial light modulator can further include a plurality of piezoelectric devices coupled with the substrate, each piezoelectric device being configured to produce an acoustic wave to assist the separation between the mirror plate and the substrate.

Embodiments may include one or more of the following advantages. The present invention incorporates a piezoelectric device in a micro mirror SLM device to assist the separation between a mirror plate and the landing tip. A piezoelectric device coupled to the mirror plate and/or the landing tips can generate acoustic waves to break the adhesive forces at the interface of the landing tip and the mirror plate. The mirror plate can thus be reliably separated from the landing tip to allow the mirror plate to change its orientation. Moreover, a single piezoelectric device can be used to assist the separations of a plurality of mirror plates with their respective landing tips. This feature simplifies the fabrication process and is more cost-effective than separation mechanisms based on individual micro mirrors. Furthermore, the piezoelectric devices and the tilting of the mirror plates can be independently controlled. The mirror tilting and the mirror-landing-tip separation can be separately optimized without compromising each other.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

FIGS. 8a-8g illustrate alternative configurations for constructing the piezoelectric device in a micro-mirror spatial light modulator.

DETAILED DESCRIPTION

To facilitate a change in state, a cell of a micro-mirror array can include a spring that can stored and release energy. In particular, the spring can be added to the mirror plate or to the substrate to overcome the stiction between the mirror plate and the landing tip. A vertical landing tip configured to flex is one example of a spring. A reset voltage is first applied between the mirror plate and a surface electrode to produce an attractive electrostatic force between the mirror plate and the landing tip to store elastic energy in the spring. An opposite electrostatic force subsequently drives the mirror plate away from the landing tip. The spring can snap back and help to separate the mirror plate from the landing tip. The electric voltages must be high enough to store enough energy in the spring so there is enough elastic energy to be released to assist the separation of the mirror plate and the landing tip. High voltage electronics increase complexity and costs in the electronic circuitry. Moreover, the spring structure can occupy a significant portion of the driving electrodes, thus reducing active electrode area for generating the electrostatic forces and consequently increasing driving voltages.

Figure 1:
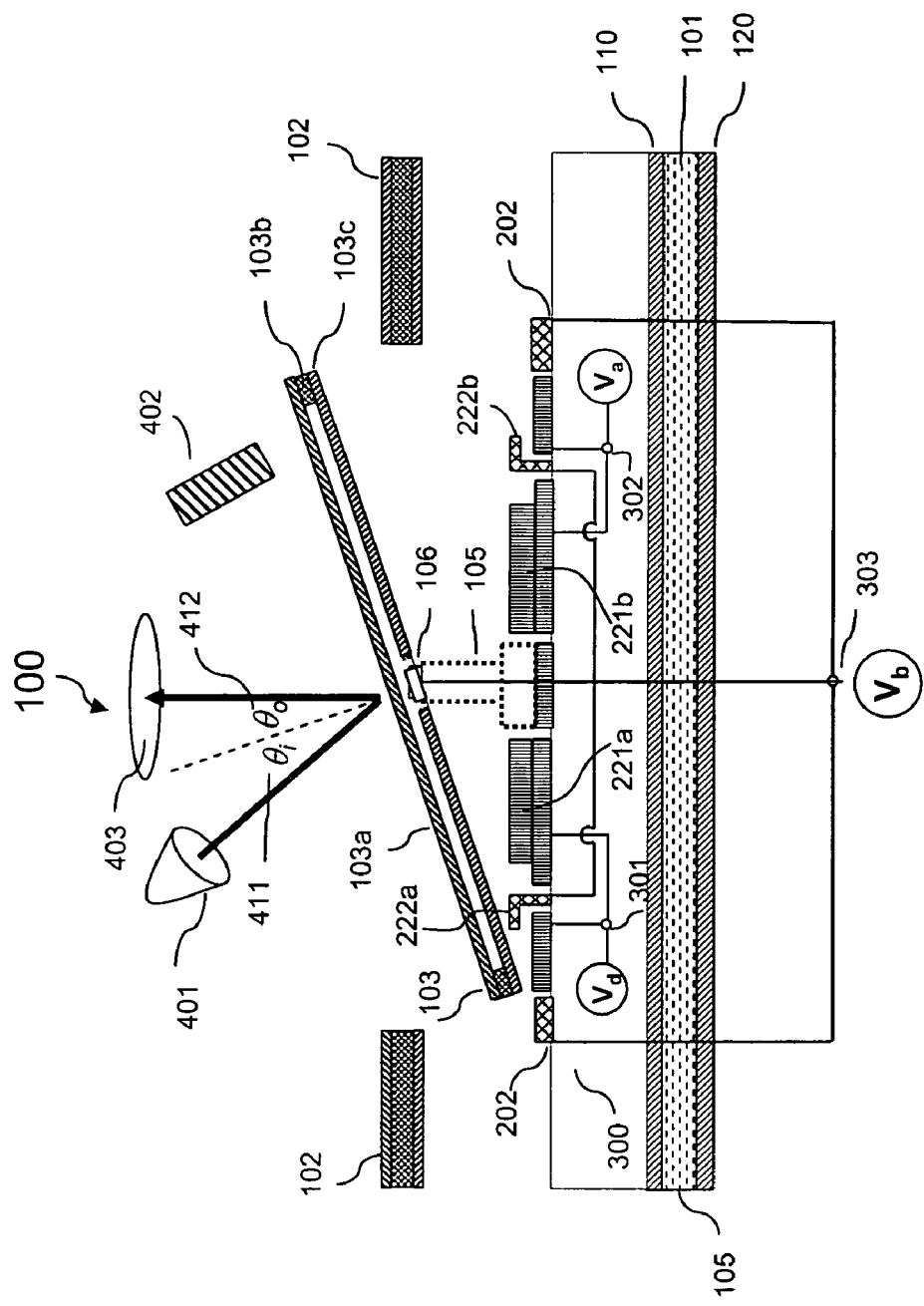
FIG. 1 is a cross section view of a part of a spatial light modulator comprising a micro-mirror and a piezoelectric device.
Figure 2:
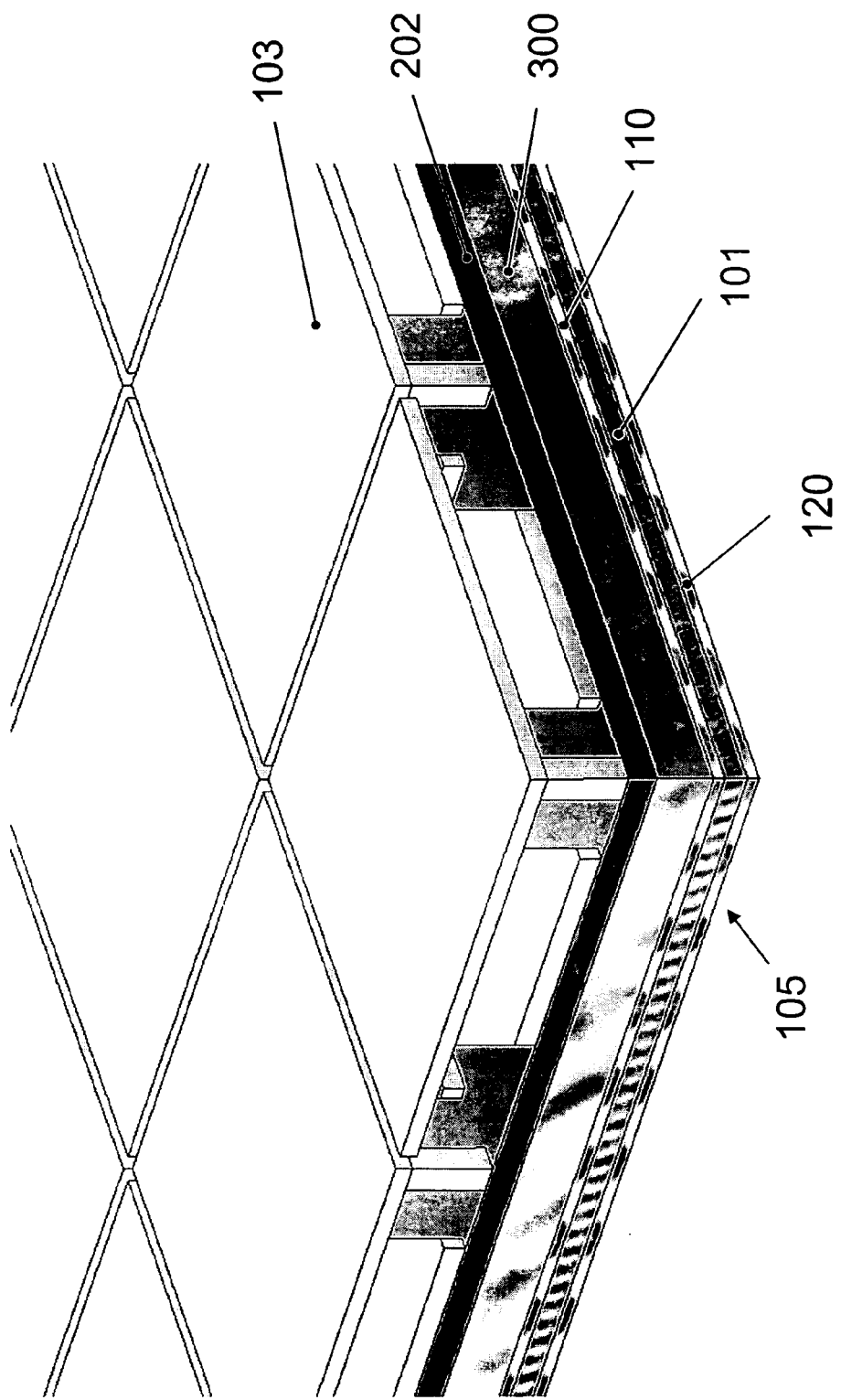
FIG. 2 is a perspective view of the spatial light modulator.
Figure 3:
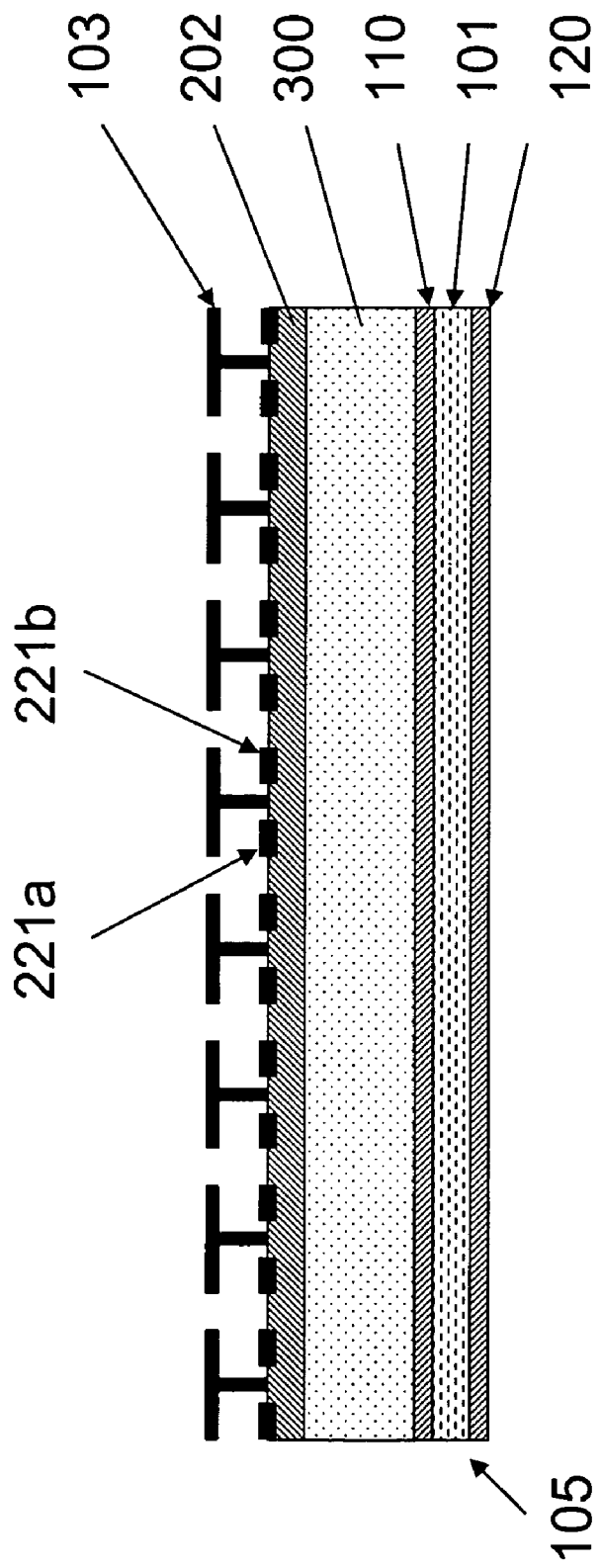
FIG. 3 is a cross-section view of an implementation of a spatial light modulator having a piezoelectric device in connection with the lower surface of the substrate.

FIGS. 1-3 depict a spatial light modulator (SLM) 100. The SLM 100 includes an upper portion that includes mirror plates 102 and 103 and a torsion hinge 106 hidden in a cavity having an opening in the lower surface of the mirror plate 103. The SLM 100 also includes electrodes 221a and 221b, landing springs tips 222a and 222b, and a hinge support post 105 in the middle portion. The SLM 100 also includes circuitry for addressing and driving the mirror plates 102 and 103 in the bottom portion.

The landing springs tips 222a and 222b are joined with the substrate and are generally aligned toward the lower surface of the mirror plate 103. The landing tips 222a and 222b can also include a horizontal portion at the upper end of the upright portion. The horizontal portion can be in contact with the lower surface of the mirror plate 103 to stop its tilt movement. The landing tip 222a and 222b can be distorted when it is in contact with mirror plate and stores elastic energies that can be released when the mirror plate 103 is tilted to a new orientation. The mirror plates as well as the associated addressing driving electrodes and electronics can be referred as an electrostatic micro actuator. In another implementation, a landing tip can be constructed to be connected with the mirror plate instead of the substrate.

The bottom portion includes a substrate 300 having electronic circuitry for selectively controlling the operations of the mirror plates 102 and 103. The electronic circuitry comprises an array of memory cells, word-line/bit-lines, and interconnects for addressing each mirror and for transmitting control signals. The electronic circuitry on a silicon wafer substrate can be fabricated using standard complementary metal oxide semiconductor (CMOS) technology. The hinge support post 105 is electrically connected to the hinge layer 106 and can set the electric potential for the layer 103c.

The middle portion of the SLM 100 includes electrodes 221a and 222b, landing tips 222a and 222b, a hinge support post 105, and a support frame 202. The electrodes 221a and 222b for a mirror plate 103 are disposed on the two sides of the hinge support post 105. They can be separately controlled by an external voltage Va at the electrode 302 and an external voltage Vd at the electrode 301, respectively. The electrodes 221 can include multiple steps to reduce the distance between the mirror plate 103 and the electrodes 221a or 221b. The reduced distance between the mirror plate 103 and the step electrode 221a or 222b can improve the electrostatic coupling between the mirror plate 103 and the step electrode 221a, 222b, which allows the use of a relatively low drive voltage and improves the response of the mirror plate. The height of the steps in the electrodes 221a and 221b can be in the range of 0.2 microns to 3 microns.

The landing tips 222a and 222b provide stops for the mirror plate 103 at precise tilt angles. As shown in FIG. 1, the landing tips 222a and 222b are electrically connected to the hinge support frame 202. The landing tips 222a and 222b are kept at the same electric potential $V_b$ as the lower conductive surface of the mirror plate 103. This configuration ensures that there is proper voltage bias between the mirror plate 103 and the step electrodes 221a or 222b and that no current transfer occurs between the mirror plate and the landing tips. The landing tips 222a and 222b can include one or more of the following materials silicon, poly-silicon, polysilicon germanium, amorphous silicon, aluminum, aluminum alloys, titanium, tantalum, tungsten, and molybdenum. The landing tips 222a and 222b can be constructed in connection with the hinge support layer 103c. The landing tips and opposing contact surfaces can be coated with materials that have low adhesion forces, for example, nitrides, titanium nitride, and others. The landing tips and contacting surface 103c can include an anti-stiction coating such as a fluorinated organic material.

The mirror plate 103 can include one or more layers. For example, the mirror plate 103 can include a reflective top layer 103a. The reflective top layer 103a can be made of aluminum or an aluminum alloy with approximately 60 to 100 nm in thickness. When landing tips are on the stationary part of the electrostatic micro actuator, the layer 103c can be eliminated and the layer 103b can be reduced to a supporting spacer only. Layers 103b and 103c can be made of metals such as titanium or amorphous silicon or polysilicon germanium if low temperature processing that is compatible with CMOS circuitry deposited earlier is required. A middle layer 103b can be approximately 200 nm thick. A lower conductive bottom layer 103c can be made of metals such as titanium and aluminum or heavily doped semiconductor materials such as polysilicon, polysilicon germanium, and amorphous silicon. The lower conductive bottom layer 103c can be about 60 nm in thickness. The lower conductive bottom layer 103c and the landing tips 222a and 222b are connected to the same electrode 303 and kept at the same electric potential $V_b$ in the spatial light modulation.

A pair of torsion hinges 106 can be fabricated out of the same layer as the bottom layer 103c as described below. The pair of torsion hinges 106 is connected to the mirror plate 103. The torsion hinge 106 extends into a cavity in the lower portion of mirror plate 103 such that the torsion hinge 106 is located at a short distance from the reflective surface of the mirror plate. This configuration minimizes the horizontal displacement of the mirror plate 103 when it tilts around the pivot point defined by the torsion hinge 106. As a result, the gap between adjacent mirror plates 102 and 103 can be reduced to below 200 nm. The active reflection area and fill-ratio for a micro-mirror array are therefore increased.

In one implementation, the materials used for micro deflection devices can be electrically conductive, stable, with suitable hardness, elasticity, and of low mechanical stress. A single material can provide both the stiffness of mirror plate 103 and plasticity of torsion hinges 106 having sufficient strength to deflect without fracturing. Furthermore, all the materials used in constructing the micro-mirror array have to be processed under 400 to 450° C., a typical processing temperature that does not damage the pre-fabricated circuitries in the control substrate. The materials of mirror plates 102 and 103, torsion hinges 106, and support posts 105 can be made of electromechanical materials, such as silicon (including single crystal silicon, poly-silicon, poly silicon germanium and amorphous silicon), aluminum-silicon, various metals such as aluminum, titanium, tantalum and their alloys. The deposition can be accomplished by physical vapor deposition (PVD) such as magnetron sputtering from one or multiple targets. Same structure layers may also be formed by plasma enhanced chemical vapor deposition (PECVD).

Refractory metal and their silicides are compatible with CMOS semiconductor processing and have relatively good mechanical properties. These materials can be deposited by PVD, by CVD, and by PECVD. The optical reflectivity may be enhanced by further PVD depositing a layer of metallic thin-films 103, such as aluminum, gold, or their alloys depending on the applications.

The mirror plate 103 can be tilted toward the electrode 221a and stopped by the landing tip 222a. The top reflective surface of the mirror plate faces the upper left direction as shown in FIG. 1. An incident light beam 411 is produced by a light source 401 to illuminate the mirror plate 103 at an angle of incidence $\theta_i$. The light beam 412 is deflected by an angle $\theta_o$ toward an optical system 403 which directs the deflected light beam for display as an output signal. This configuration of the mirror plate is referred to as the "on" position. The deflection angle of the mirror plate 103 is determined by the width of the mirror plate, the height of hinge support posts 105, and the height and the location of the landing tips.

The mirror plate 103 can be tilted toward another electrode 221b to face the upper right direction to deflect incident light beam 411 away from the optical system 403 at an angle $\theta_o$. The deflected light 411 can be directed toward a light absorber 402. The latter configuration defines an "off" position for the mirror plate in the light modulation operation.

In one implementation, the SLM 100 can comprise an array of passive micro-mirror devices. The micro mirrors can be positioned in a plurality of cells distributed in an array of columns and rows. The micro mirrors can be addressed and actuated by a plurality of electrodes parallel to the columns direction and a plurality of electrodes parallel to the row direction. Each micro mirror is not individually actuated by a local amplifier in the associated cell. A suitable passive micro-mirror array is disclosed in commonly assigned U.S. application Ser. No. 11/299,232, entitled "Passive Micro-Mirror Array Spatial Light Modulation", filed Dec. 9, 2005, the content of which is incorporated herein by reference.

The SLM 100 further includes a piezoelectric device 105 for overcoming the contact stiction between the mirror plate 103 and the stationary surface 202 or the landing springs 222a and 222b. The piezoelectric device includes a piezoelectric material 101 and actuation electrodes 110 and 120.

As described above, the tilt movement of the mirror plate 103 can be affected by the contact stiction between the mirror plate 103 and the landing tips 222a and 222b or the surface 202 when landing tips are not used. The SLM 100 cannot properly function if the mirror plate 103 is stuck to the landing tips 222a or 222b or the surface 202. The SLM 100 includes a piezoelectric device 105 to assist the separation between the landing tips 222a, 222b and the mirror plate 103. The piezoelectric device 105 can be bonded to the bottom of the substrate 300 as shown in FIG. 1-3. A layer of piezoelectric material 101 can be sandwiched between the actuation electrodes 110 and 120. Examples of the piezoelectric materials include lead zirconium titanates and zinc oxides. An electric voltage can be applied between the actuation electrodes 110 and 120 to produce an electric field in the piezoelectric material 101. The electric field in the piezoelectric material 101 in turn generates an acoustic wave that propagates from the piezoelectric device 105 to the substrate 300, the surface 202 or landing tips 222a and 222b, and the mirror plate 103. The vibrations of the acoustic waves can help separate the mirror plate 103 and the landing tips 222a, 222b, which enables a low voltage signal to tilt the mirror plate 103. In one implementation, as shown in FIGS. 1-3, a single piezoelectric device 105 can generate acoustic waves in a plurality of micro mirrors.

In should be understood that the disclosed invention system and methods are compatible with many variations of micro mechanical devices beyond the specific configurations of the spatial modulator shown in FIGS. 1-6. In one embodiment, a micro-mechanical device can include a first movable mechanical component and a second mechanical component. The second mechanical component can be stationary and can limit the movement of the first mechanical component by coming into contact with a portion of the first mechanical component. The movement can include a translation, a rotation, or a combination of a translation and a rotation. A piezoelectric device is coupled with the first mechanical component, the second mechanical component, or both components. The piezoelectric device can produce an acoustic wave to assist the separation between the first mechanical component and the second mechanical component.

Figure 4:
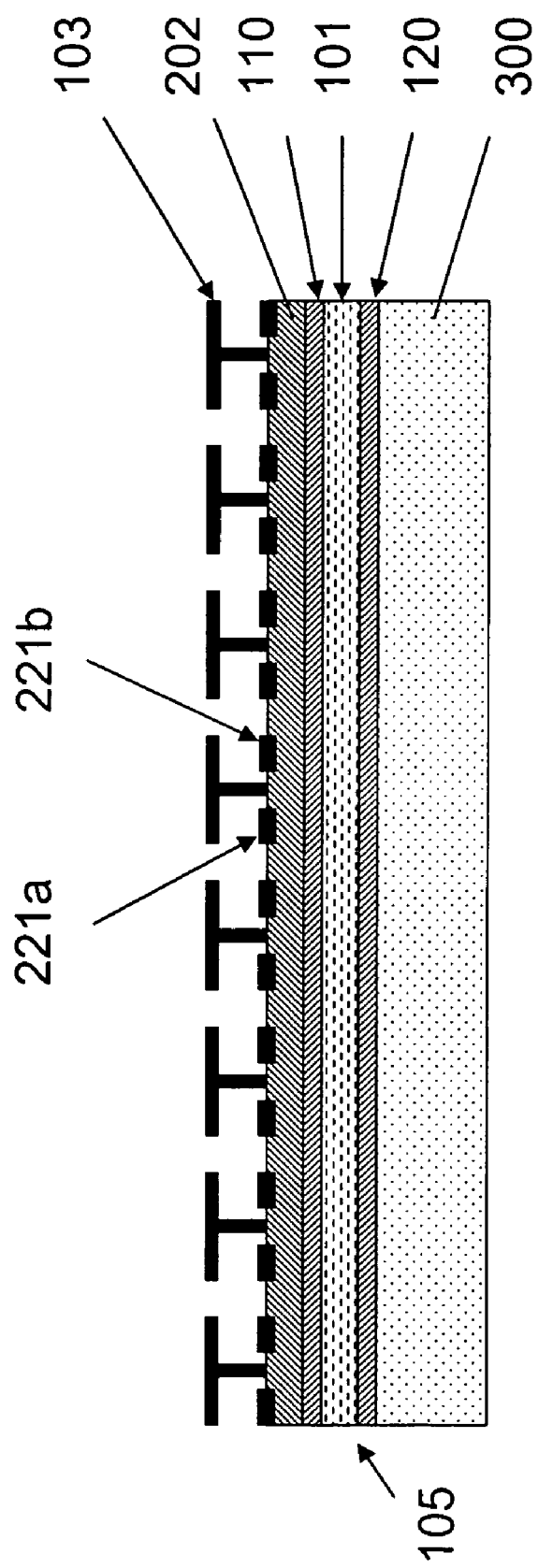
FIG. 4 is a cross-section view of another implementation of a spatial light modulator having a piezoelectric device sandwiched between the hinge support frame and the substrate.

In another embodiment, as shown schematically in FIG. 4, the piezoelectric device 105 is sandwiched between the support frame 202 and the substrate 300. The close distance between the piezoelectric device 105 and the micro-mirrors can produce stronger acoustic waves with larger mechanical displacements and more effective separations of the mirror plates 103 from the surface 202 or landing tips 222a and 222b. The actuation strength of the piezoelectric device can be further increased by using a stack of piezoelectric layers, which can produce larger displacements in the acoustic waves for a given applied voltage.

Figure 5:
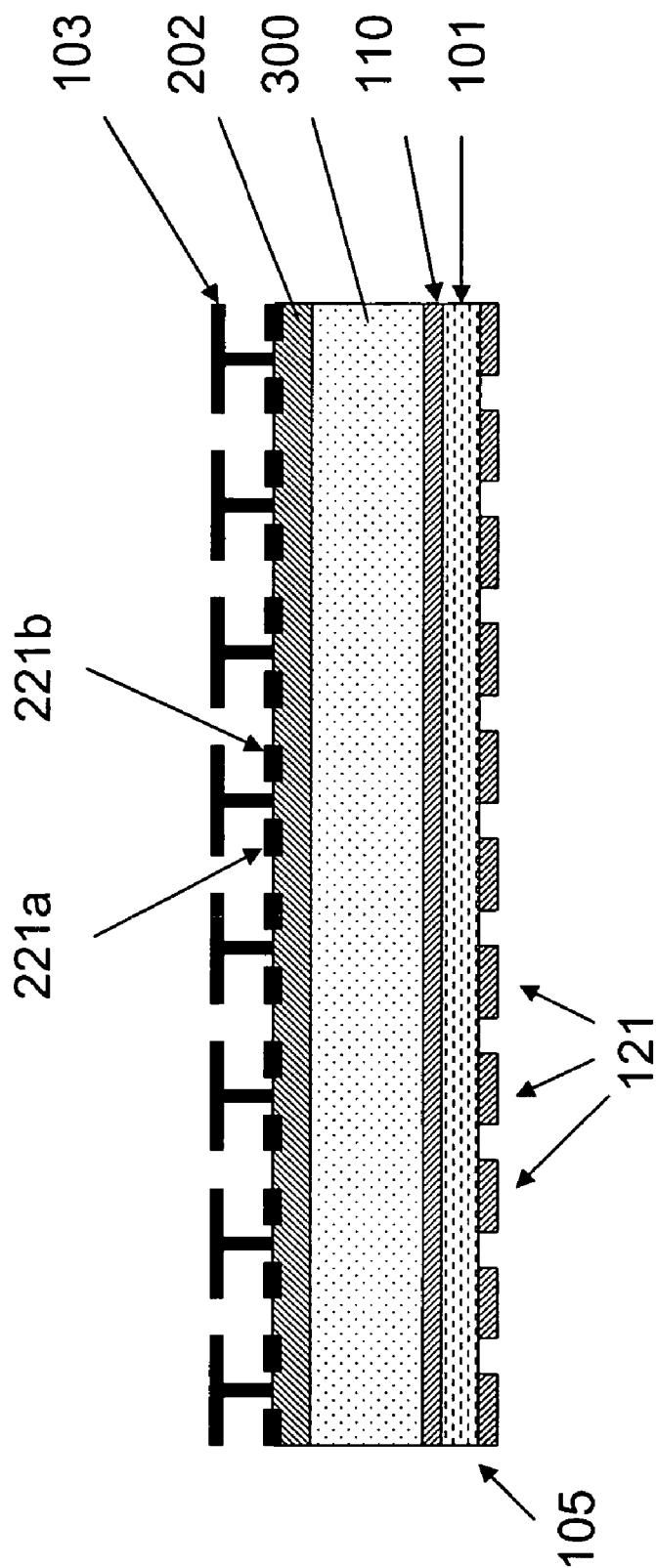
FIG. 5 is a cross-section view of another implementation of a spatial light modulator having a piezoelectric device comprising a piezoelectric layer and a plurality of actuation electrodes.

An alternative design of the piezoelectric device 105 is shown in FIG. 5. The piezoelectric device 105 includes an actuation electrode 110 over a layer of the piezoelectric material 101 and a plurality of actuation electrodes 121 coupled to the lower surface of the piezoelectric material 101. The actuation electrodes 121 of opposite electric polarities can be distributed alternatively on the lower surface of the piezoelectric material 101. Each of the actuation electrodes 121 can be individually addressed. Adjacent actuation electrodes 121 can be excited by sequential voltage waveforms between the actuation electrodes 121 and the actuation electrode 110 to establish electric fields in different segments of the layer of the piezoelectric material 101 by applying voltage bias. Acoustic waves can be generated to target the micro mirrors in different locations of the SLM 100.

Figure 6:
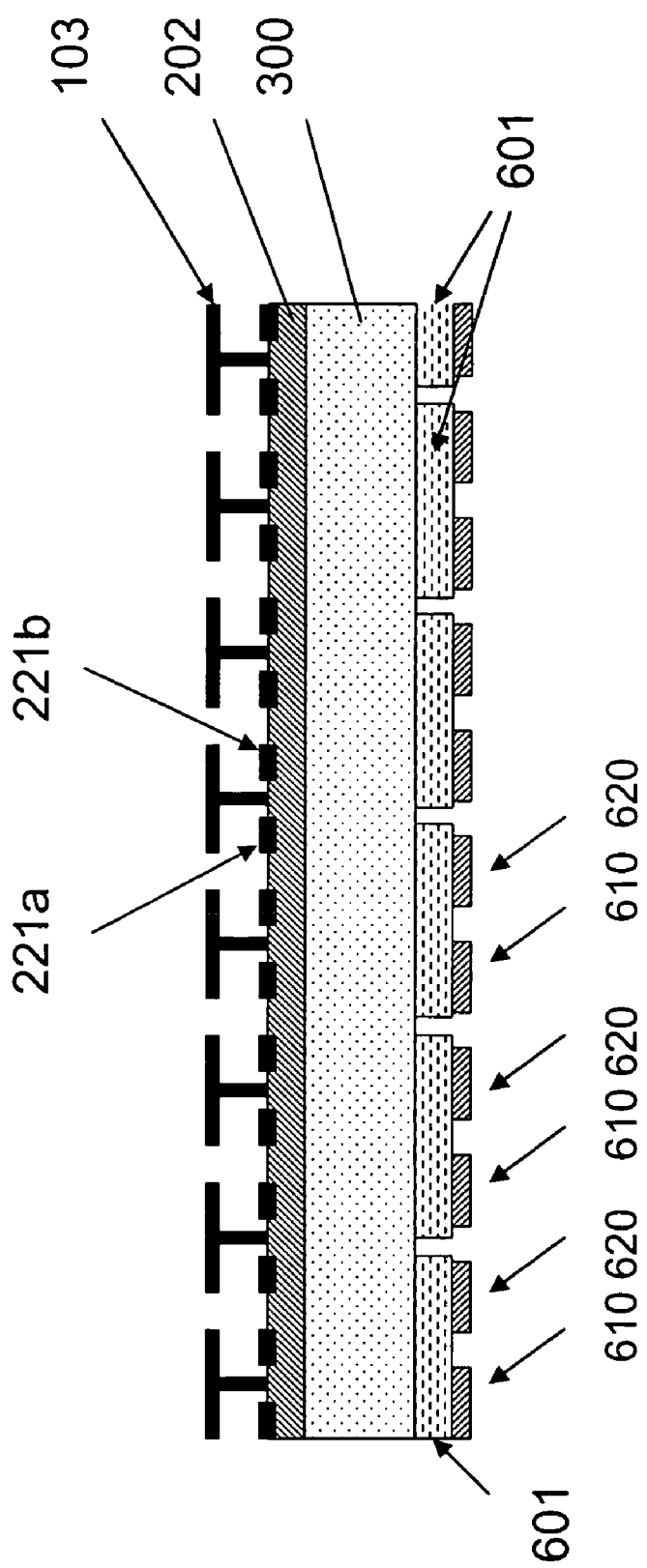
FIG. 6 is a cross-section view of another implementation of a spatial light modulator comprising a plurality of piezoelectric devices each having a piezoelectric layer and actuation electrodes.

The piezoelectric devices 610 and 620 can also be disposed on a same surface of the piezoelectric material 601, as shown in FIG. 6. A plurality of piezoelectric materials 601 can be bonded to the lower surface of the substrate 300 or deposited onto the substrate 300 by PVD or CVD techniques, lithographic patterning, and/or etching. Each piezoelectric material 601 can be coupled with one or more pairs of actuation electrodes 610 and 620. Electric voltage potentials can be established between pairs of piezoelectric devices 610 and 620 to enable the corresponding piezoelectric material 610 to produce acoustic waves. The acoustic waves are local to different areas of the SLM 100 to specifically enable the separations between the layer 202 or landing tips 222 and mirror plates 103 in each area. The electrodes 610 and 620 located at close distances on the same surface of the piezoelectric material 101 allow the use of lower actuation driving voltages and allow efficient generation of acoustic pulses to break the attractive forces between micro-mirror and substrate. Furthermore, vibrations parallel and normal to substrate surface can be produced in the substrate, landing tips, and the mirror plates.

Figure 7A:
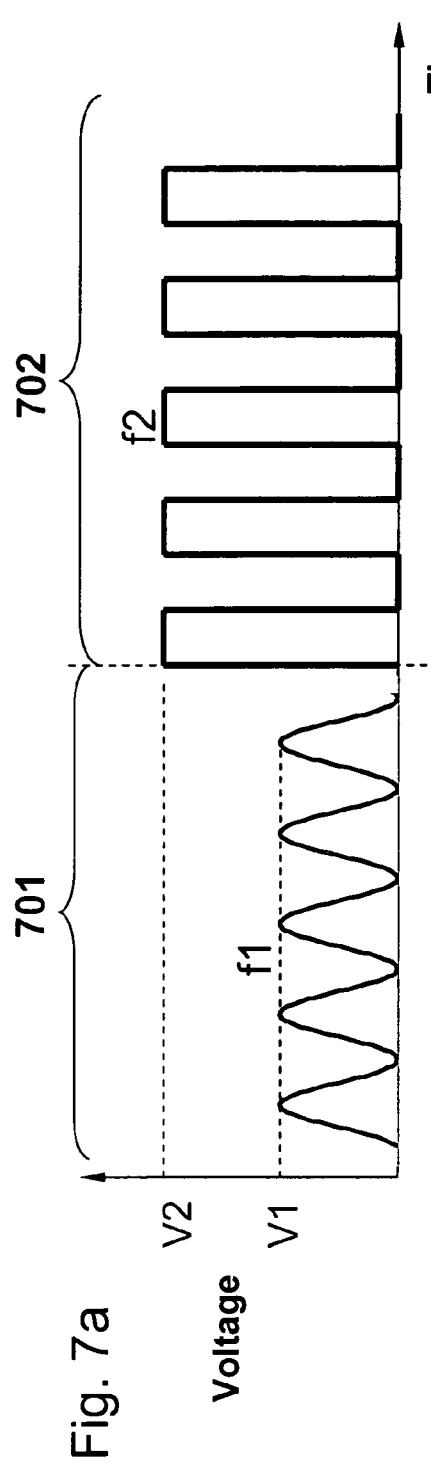
FIGS. 7a-7c illustrate exemplified voltage waveforms for driving the piezoelectric devices, the resulting movements of the micro-mirrors, and the electric voltage pulses for driving the tilt movements of the micro mirrors.
Figure 7B:
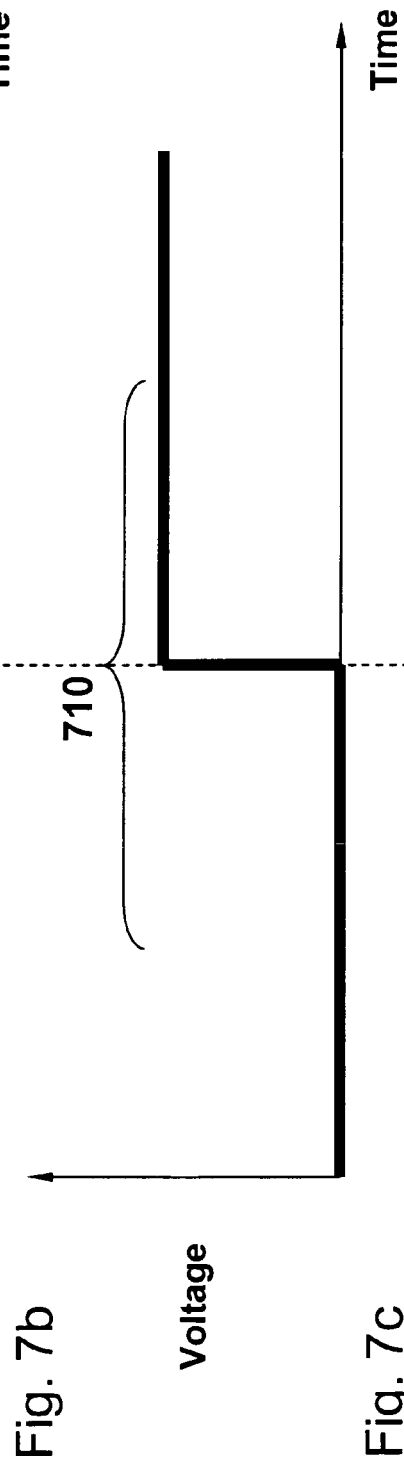
Figure 7C:
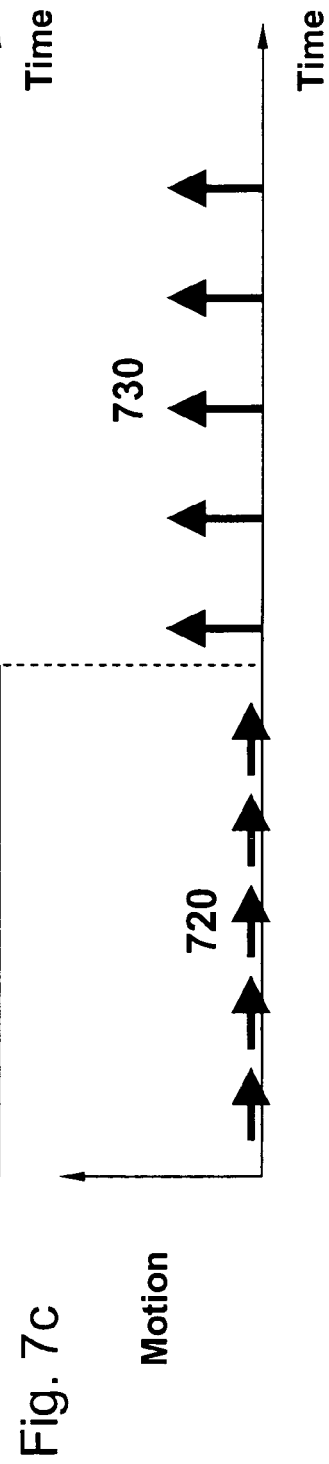

FIG. 7a illustrates examples of voltage waveforms 701 and 702 that can be applied to the actuation electrodes 610 and 620, 110 and 120, or 110 and 121. FIG. 7b illustrates the electric voltage waveforms 710 for driving the rotation of the micro mirror. FIG. 7c illustrates the vibrations of the acoustic waves 720 and 730 produced by the voltage waveforms. The magnitude of the acoustic waves is determined by the magnitude of the voltage pulse. The typical driving voltages are in the range of a few volts to tens of volts, depending on the thickness of piezoelectric material and desired amplitude of acoustic waves. It should be pointed out that displacements of the order of 0.1 to 1 nanometer are adequate to separate surfaces in contact as inter-atomic and intermolecular attractive forces drop extremely fast with separation distance.

The waveform can include two separate sequential segments 701 and 702. The waveform 701 can create lateral acoustic waves having vibrations 720 parallel to the surface of the substrate 300 in the landing tips and the mirror plate. The second waveform 702 generates the vibrations 730 substantially normal to the substrate surface in the landing tips and the mirror. The voltage waveforms 701 and 702 can be synchronized with the voltage waveform 710 that drives the tilt movement of the mirror plate 103. The voltage waveform 701 can be applied to produce lateral vibrations to break the contact stiction between the landing tip and the mirror plate before a voltage pulse is applied in waveform 710. Normal vibrations are generated in the mirror plate and the landing tips to separate the landing tip and the mirror plate between them when a voltage pulse is applied in waveform 710 to drive the mirror plate away from the landing tip.

The piezoelectric device can be constructed in various configurations in a micro-mirror spatial light modulator. FIGS. 8a-8g illustrate the configurations for a number of generic components including: the micro mirror layer 800, the piezoelectric device layer 810 that includes the piezoelectric material and the actuation electrodes, the electronics layer 820 that includes the circuitry for addressing and controlling the micro mirrors. The integration options for these components include the monolithic fabrication 830 between micro mirrors and piezoelectric device, the monolithic fabrication 840 between piezoelectric device and electronics, the bonding 850 between micro mirrors and piezoelectric device, the bonding 860 between piezoelectric device and electronics, the monolithic fabrication 870 between micro mirrors and electronics, and the bonding 880 between micro mirrors and electronics. In the present specification, a monolithic interface refers to an interface at which the crystal lattices of? the materials on the two sides of the interface are matched. A monolithic interface can be obtained, for example, by expitaxial growth of one material over the surface of a different material by for example by PVD.

FIGS. 8a-8d illustrate arrangements in which the piezoelectric device layer 810 is sandwiched between the micro mirror layer 800 and electronics layer 820. The micro mirror layer 800 and the piezoelectric device layer 810 can be monolithically joined (indicated by interface 830) as in the configurations shown in FIGS. 8a and 8c. At the monolithic interface, the crystal lattices of the micro mirror layer 800 and the piezoelectric device layer 810 are expitaxially connected. An expitaxial growth of one material over the surface of a different material can be accomplished by for example by PVD. The micro mirror layer 800 and the piezoelectric device layer 810 can also be bonded (indicated by bonding layer 850) as in the configurations shown in FIGS. 8b and 8d. The piezoelectric device layer 810 and the electronics layer 820 can be monolithically joined (indicated by interface 840) as in the configurations shown in FIGS. 8a and 8b or bonded (indicated by bonding layer 860) as in the configurations shown in FIGS. 8c and 8d.

Figure 8E:
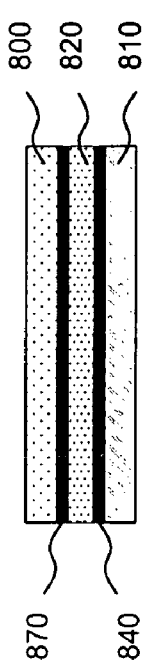
Figure 8F:
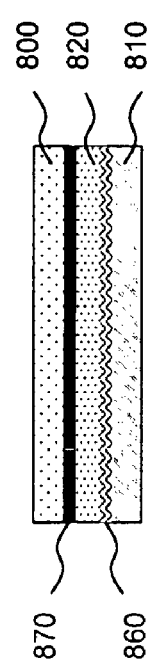
Figure 8G:
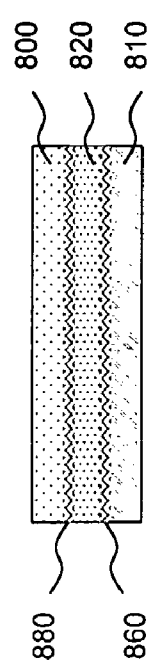

FIGS. 8e-8g illustrate arrangements in which the piezoelectric device layer 810 is fabricated on the lower surface of the electronics layer 820 that is in turn joined to the lower surface of the micro mirror layer 800. The micro mirror layer 800 and the electronics layer 820 can be monolithically joined (indicated by interface 870) as in the configurations shown in FIGS. 8e and 8f or bonded (indicated by bonding layer 880) as in the configuration in FIG. 8g. The electronics layer 830 and the piezoelectric device layer 810 can be monolithically joined (indicated by interface 840) as in the configurations shown in FIG. 8e or bonded (indicated by bonding layer 860) as in the configurations shown in FIGS. 8f and 8g.

The fabrication of the micro mirrors with piezoelectric release depends on the location of piezoelectric release mechanism. As shown in FIGS. 8a-8g, the piezoelectric device layer can be constructed on the lower outer surface of the substrate or between the addressing electronics the upper portion of the substrate that support the hinges, the landing tips and the step electrodes.

In the case of external placement, the piezoelectric device layer can be either attached or directly fabricated on the exterior surface of the substrate. The attached structure can consist of a thin layer of piezoelectric material surrounded by electrodes on both sides or by electrodes on one side, a very thin layer of conductive epoxy or other thermally conductive adhesive can bond the thin piezoelectric sheet to the exterior surface of the substrate. Alternatively, the piezoelectric device layer can be deposited by conventional vacuum deposition techniques directly on the external substrate surface sequentially, starting with the first electrode, then depositing the piezoelectric material and finally depositing the second electrode. The piezoelectric device can be fabricated before the addressing electronics is defined, when the processing temperatures for annealing of piezoelectric material exceed those of standard semiconductor processing (e.g., 450 C) or after semiconductor and actuator processing when deposition temperatures are below these limits.

When the piezo-structure is placed in the interior between addressing electronics and actuator electrodes, the piezoelectric material layer can be deposited by vacuum deposition techniques mentioned above. For monolithic structures fabricated by sequential fabrication of the micro-electro-mechanical structure directly on top of electronics, the typical fabrication sequence includes electronics first, the piezoelectric material layer second and the actuation electrodes last. The electrical leads between the addressing electronics and electrodes of the actuators are provided by electrical vias. The electronics is initially covered by electrically insulating layer of silicon dioxide or silicon nitride or similar material.

Several processes can be used to form two actuation electrodes, the piezoelectric layer, and electrical vias that connect addressing and reset electronics to micro actuators. In one embodiment, the first actuation electrode is deposited, patterned and etched in the regions that will accommodate electrical vias. Piezoelectric material is deposited next, followed by deposition, patterning and etching of the second actuation electrode, again in regions that will accommodate electrical vias. The monolithic fabrication of the piezoelectric structure can include via patterning, etching, deposition of the electrical via liners, filling vias with tungsten or similar metal using CVD, and chemical mechanical polishing.

In an alternative embodiment, the first actuation electrode is first formed. A piezoelectric film is deposited over the first actuation electrode. The second actuation electrode is formed over the piezoelectric film. The dielectric layer is formed over the second actuation electrode and then patterned to form electrical vias through the dielectric layers, the actuation electrodes and the piezoelectric film. The patterned structure is oxidized or covered with electrically insulating material in order to prevent electrical contact between the actuation electrodes and electrical vias to be formed next. A subsequent anisotropic etch removes the dielectric material at the bottom of openings but leaves the insulator on the walls. Subsequently, electrical vias are formed by conventional techniques such as deposition of electrical liner (e.g. titanium nitride) followed by tungsten deposition. Finally, a chemical-mechanical polishing defines the electrical contacts from the addressing electronics through the piezoelectric layer to the actuators.

In the case of non-monolithic fabrication, the actuator wafer and the electronics wafer are separately fabricated. The piezoelectric layer with vias can be defined on the actuator wafer or on electronics wafer by the above described process. The SLM is formed by bonding the two wafers together.

It should be understood that the disclosed spatial light modulator is not limited to the specific configurations and modes of operation described in this specification. The micro mirrors, the piezoelectric device, and the substrate can be coupled together in numerous configurations without deviating from the spirit of the specification. The piezoelectric device and the micro mirrors can also be actuated by different waveforms not described or illustrated above. The piezoelectric devices can comprise a variety of piezoelectric materials and include different arrangements between the piezoelectric materials and the actuation electrodes.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A spatial light modulator, comprising:
a substrate that includes an object;
a hinge in connection with the substrate;
a mirror plate that is connected with the hinge and is configured to tilt about the hinge, the object being configured and situated to stop the mirror plate at a particular tilt angle; and
a piezoelectric device coupled with the substrate, the piezoelectric device being configured to produce an acoustic wave to assist the separation between the mirror plate and the object.

2. The spatial light modulator of claim 1, wherein the object in connection with the substrate is a landing tip, and wherein the piezoelectric device is configured to produce an acoustic wave to assist the separation between the mirror plate and the landing tip.

3. The spatial light modulator of claim 1, wherein the mirror plate comprises one or more landing tips configured to contact the upper surface of the substrate to limit the tilt movement of the mirror plate in one or more directions, and wherein the piezoelectric device is configured to produce an acoustic wave to assist the separation between the landing tips and the substrate.

4. The spatial light modulator of claim 1, wherein the substrate comprises an electrode over the upper surface of the substrate and the mirror plate comprises a conductive surface.

5. The spatial light modulator of claim 4, wherein the mirror plate is configured to tilt when an electric voltage is applied between the electrode over the substrate and the conductive surface of the mirror plate.

6. The spatial light modulator of claim 1, wherein the mirror plate comprising a reflective upper surface, a lower surface having a conductive surface portion, and a cavity having an opening on the lower surface.

7. The spatial light modulator of claim 6, wherein the hinge extends into the cavity.

8. The spatial light modulator of claim 1, wherein the piezoelectric device is configured to produce an acoustic wave that vibrates substantially perpendicular or parallel to the surface of the substrate.

9. The spatial light modulator of claim 1, wherein the piezoelectric device is configured to produce a first acoustic wave that vibrates substantially parallel to the surface of the substrate and a second acoustic wave that vibrates substantially perpendicular to the surface of the substrate.

10. The spatial light modulator of claim 1, wherein the piezoelectric device comprises a piezoelectric material, and a first actuation electrode and a second actuation electrode configured to produce an electric field across the piezoelectric material to produce the acoustic wave to assist the separation between the mirror plate and the substrate.

11. The spatial light modulator of claim 10, wherein the piezoelectric material comprises lead zirconium titanate or zinc oxide.

12. The spatial light modulator of claim 10, wherein the first actuation electrode and the second actuation electrode are disposed on the same surface of the piezoelectric material.

13. The spatial light modulator of claim 12, further comprising a plurality of first actuation electrodes and a plurality of second actuation electrodes disposed on the same surface of the piezoelectric material.

14. The spatial light modulator of claim 10, wherein the first actuation electrode and the second actuation electrode are disposed on the opposite surfaces of the piezoelectric material.

15. The spatial light modulator of claim 1, wherein the substrate comprises an upper portion that supports the hinge and a lower portion, and wherein the piezoelectric device is sandwiched between the upper portion of the substrate and the lower portion of the substrate.

16. The spatial light modulator of claim 15, wherein the piezoelectric device is monolithically connected to the upper portion of the substrate or the lower portion of the substrate.

17. The spatial light modulator of claim 15, wherein the piezoelectric device is bonded with the upper portion of the substrate or the lower portion of the substrate.

18. The spatial light modulator of claim 1, wherein the piezoelectric device is connected to the lower surface of the substrate.

19. The spatial light modulator of claim 18, wherein the piezoelectric device is monolithically connected to or bonded with the lower surface of the substrate.

20. The spatial light modulator of claim 1, further comprising:
a plurality of piezoelectric devices coupled with the substrate, each configured to produce an acoustic wave to assist the separation between the mirror plate and the substrate.

21. A spatial light modulator, comprising:
a substrate;
a hinge in connection with the substrate;
a mirror plate that is connected with the hinge and is configured to tilt about the hinge;
a landing tip in connection with the substrate, wherein the landing tip is configured to contact the lower surface of the mirror plate to limit the tilt movement of the mirror plate; and
a piezoelectric device coupled with the substrate and configured to produce an acoustic wave to assist the separation between the mirror plate and the landing tip.

22. The spatial light modulator of claim 21, wherein the piezoelectric device is configured to produce an acoustic wave that vibrates substantially perpendicular or parallel to the surface of the substrate.

23. The spatial light modulator of claim 21, wherein the piezoelectric device comprises a piezoelectric material, and a first actuation electrode and a second actuation electrode configured to produce an electric field across the piezoelectric material to produce the acoustic wave to assist the separation between the mirror plate and the substrate.

24. The spatial light modulator of claim 23, wherein the first actuation electrode and the second actuation electrode are disposed on the same surface of the piezoelectric material.

25. The spatial light modulator of claim 24, further comprising a plurality of first actuation electrodes and a plurality of second actuation electrodes disposed on the same surface of the piezoelectric material.

26. The spatial light modulator of claim 23, wherein the first actuation electrode and the second actuation electrode are disposed on the opposite surfaces of the piezoelectric material.

27. The spatial light modulator of claim 21, wherein the substrate comprises an upper portion that supports the hinge and a lower portion, and wherein the piezoelectric device is sandwiched between the upper portion of the substrate and the lower portion of the substrate.

28. The spatial light modulator of claim 21, wherein the piezoelectric device is connected to the lower surface of the substrate.

29. A method for fabricating a spatial light modulator, comprising:
fabricating a hinge over a substrate;
fabricating a mirror plate in connection with the hinge, wherein the mirror plate can tilt about the hinge and be stopped when the mirror plate comes into contact with an object over the substrate; and
coupling a piezoelectric device with the substrate such that piezoelectric devices can produce an acoustic wave to assist the separation between the mirror plate and the object in connection with substrate.

30. The method of claim 29, wherein the piezoelectric device comprises a piezoelectric material, and a first actuation electrode and a second actuation electrode configured to produce an electric field across the piezoelectric material to produce the acoustic wave to assist the separation between the mirror plate and the object.

31. The method of claim 30, wherein the first actuation electrode and the second actuation electrode are disposed on the same surface of the piezoelectric material.

32. The method of claim 31, further comprising a plurality of first actuation electrodes and a plurality of second actuation electrodes disposed on the same surface of the piezoelectric material.

33. The method of claim 31, wherein the first actuation electrode and the second actuation electrode are disposed on the opposite surfaces of the piezoelectric material.

34. The method of claim 29, wherein the substrate comprises an upper portion that supports the hinge and a lower portion, and wherein the piezoelectric device is sandwiched between the upper portion of the substrate and the lower portion of the substrate.

35. The method of claim 34, further comprising:
connecting the piezoelectric device monolithically to the upper portion of the substrate or the lower portion of the substrate.

36. The method of claim 34, further comprising:
bonding the piezoelectric device with the upper portion of the substrate or the lower portion of the substrate.

37. The method of claim 29, further comprising:
connecting the piezoelectric device monolithically to the lower surface of the substrate.

38. The method of claim 29, further comprising:
bonding the piezoelectric device with the lower surface of the substrate.

* * * * *